United States Patent [19]
Harnden, Jr.

[11] 3,743,897
[45] July 3, 1973

[54] HYBRID CIRCUIT ARRANGEMENT WITH METAL OXIDE VARISTOR SHUNT
[75] Inventor: John D. Harnden, Jr., Schenectady, N.Y.
[73] Assignee: General Electric Company, Syracuse, N.Y.
[22] Filed: Aug. 5, 1971
[21] Appl. No.: 169,220

[52] U.S. Cl...... 317/235 R, 317/235 D, 317/235 Q, 317/237
[51] Int. Cl. .............................................. H01l 9/00
[58] Field of Search............................ 317/235, 237

[56] References Cited
UNITED STATES PATENTS
3,614,480  10/1971  Berglund............................ 307/299

Primary Examiner—John W. Huckert
Assistant Examiner—E. Wojciechowicz
Attorney—Robert J. Mooney et al.

[57] ABSTRACT

A metal oxide varistor body having an alpha in excess of 10 in the current density range of from $10^{-3}$ to $10^2$ amperes per square centimeter is located so that it shunts laterally spaced electrodes across a discrete electronic circuit module. A dielectric may be located in the conduction gap between the electrodes. Either the electronic circuit module or the varistor body may be the substrate.

25 Claims, 8 Drawing Figures

Patented July 3, 1973

3,743,897

INVENTOR:
JOHN D. HARNDEN, JR.

BY Carl O. Thomas
HIS ATTORNEY.

HYBRID CIRCUIT ARRANGEMENT WITH METAL OXIDE VARISTOR SHUNT circuit having

My invention is directed to a circuit having laterally spaced electrical conductors including a metal oxide varistor shunt.

It can be generally stated that the stated that which flows between two spaced points is directly related to the potential difference between the points. For most known substances current conduction therethrough is equal to the applied potential difference divided by a constant, which has been defined by Ohm''s law to be its resistance. There are, however, a few known substances which have been observed to exhibit voltage dependent non-linear resistances and which require resort to the following equation (1) to relate quantitatively current and voltage:

1. $I = (V/C)^{alpha}$ where $V$ is the voltage between two points separated by a body of the substance under consideration, $I$ is the current flowing between the two points, $C$ is a constant, and alpha is an exponent greater than 1. There are many known electrical circuits in which it is quite desirable to incorporate one or more functional elements having non-linear or exponential resistance characteristics. For example, the non-linear resistance properties of silicon carbide have been widely utilized in commercial silicon carbide varistors. Typically silicon carbide varistors exhibit an alpha of no more than 6.

It has been recently appreciated that varistors having alphas in excess of 10 within the current density range of $10^{-3}$ to $10^2$ amperes per square centimeter may be made from bodies comprised of metal oxides. The metal oxide body may be formed predominantly of zinc oxide with small quantities of one or more other metal oxides also being present. Metal oxide varistors having alphas in excess of 10 are disclosed in Canadian Patent No. 831,691, issued Jan. 6, 1970, for example. While the alphas of these metal oxide varistors is identified by the current density range of $10^{-3}$ to $10^2$ amperes per square centimeter, which characteristically exhibits substantially constant alphas, it is appreciated that the alphas remain high also at higher and lower current densities, although some decline from maximum alpha values have been observed.

The construction of the conventional metal oxide varistor having an alpha in excess of 10 is shown in FIG. 1. The metal oxide varistor 1 is formed of a sintered ceramic metal oxide body 3. The body includes a first major surface 5 and a second, opposed major surface 7. The major surfaces are separated by a thickness X. First and second electrodes 9 and 11 are associated with the first and second major surfaces, respectively, so that they lie in ohmic contact therewith.

In placing the metal oxide varistor in use, when a potential difference is placed across the electrodes 9 and 11, a current is conducted through the bulk of the metal oxide body 3. Since the distance between the electrodes along the surface of the metal oxide varistor body is greater than through the bulk of the body, little, if any current is conducted along the surface of the body. For various voltage levels across the electrodes the current follows equation (1). For a given current density it has been observed that the voltage across the electrodes is a function of the thickness X.

For many circuit applications where relatively high voltage levels are desired at a given current density this relationship is convenient, as it is quite simple to choose a thickness value X to yield the desired voltage characteristic for the varistor. In circuit applications where a relatively low voltage value is desired, however, for a given current density through the varistor, the value of X may become so small that it is quite difficult either to form or to handle the metal oxide varistor body without damage and, further, very close thickness tolerances may be necessary. For example, for comparatively low voltage applications a thickness for the metal oxide varistor body of 2 or 3 microns may be indicated. Note that a thickness error of only one micron could in this case reduce the voltage characteristic by a half to a third. Finally, while the conventional structure is well suited for forming lead-mounted discrete varistors, particularly at higher voltage ratings, there are many circuits in which lead-mounted varistors are awkward to mount and relatively inefficient in heat dissipation.

It is an object of my invention to provide a hybrid circuit arrangement employing a metal oxide varistor body in shunt in which the voltage characteristic is independent of the thickness of the metal oxide body. It is a more specific object of my invention to provide a metal oxide varistor shunt circuit in which a rugged and easily formed metal oxide body having no critical dimensions can be employed for even the lowest voltage applications. It is still another object to provide a metal oxide varistor shunted circuit according to my invention which is self-protected from overloading. It is an additional object to provide a circuit shunt arrangement allowing improved heat transfer from the varistor body. It is still an additional object to provide a shunt circuit arrangement in which the varistor body is uniquely protected against alteration of its electrical properties by environmental substances.

In one aspect, my invention is directed to a circuit combination comprising first and second laterally spaced electrical conductors each having first and second opposed major surfaces. A first electronic circuit means lies in conductive contact with the first major surfaces of the first and second electrical conductors for controlling current therebetween when an electrical potential less than a predetermined maximum value is impressed across the electrical conductors. A metal oxide varistor body means having an alpha in excess of 10 in the current density range of from $10^{-3}$ to $10^2$ amperes per square centimeter lies in conductive contact with the second major surfaces of the first and second electrical conductors for variably conducting current therebetween in shunt with the first electronic circuit means to maintain the electrical potential impressed across the electrical conductors less than the predetermined maximum value.

My invention may be better understood by reference to the following detailed description considered in conjunction with the drawings, in which FIG. 1 is a schematic sectional view of the conventional metal oxide varistor discussed above;

Figure 1:
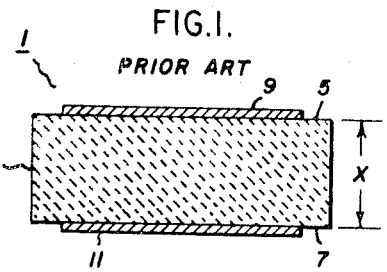
Figure 2:
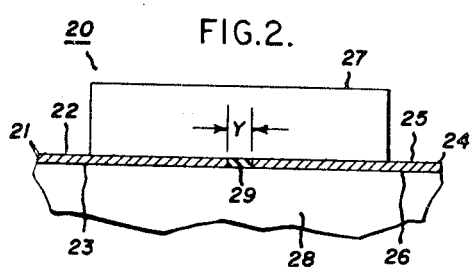
FIG. 2 is a schematic sectional detail of a hybrid varistor circuit arrangement according to my invention.

In FIG. 2 a detail of a hybrid circuit shunt arrangement 20 according to my invention is illustrated. A first electrical conductor 21 is provided with a first major surface 22 and an opposed, second major surface 23. A second electrical conductor 24 is laterally spaced from the first electrical conductor and is provided with a first major surface 25 and a second, opposed major surface 26. A first body 27 bridges the conduction gap width Y between the laterally spaced electrical conductors and is located in low impedance ohmic contact with the first major surfaces of the electrical conductors. A second body 28 serves as a support for the electrical conductors and is located in low impedance ohmic contact with the second major surfaces thereof. A dielectric body 29 is shown positioned within the spacing between the electrical conductors and is bonded to at least one of the first and second bodies.

In a first form of my invention, the first body 27 may be a discrete circuit functional element, such as a resistor, capacitor, inductance element, semiconductor element, or monolithic or hybrid integrated circuit module. In any case the discrete circuit element, while it may take any one of a wide variety of conventional forms, may be damaged if a potential difference develops across the electrical conductors in excess of a predetermined value. For example, in the case of a resistor the heat produced by power dissipated within the resistor above a predetermined value may destroy it. In a capacitor or inductance element the dielectric strength of an insulative portion may be exceeded causing failure. In the case of a semiconductor element or monolithic integrated circuit destruction reverse breakdown of a junction lying between the electrical conductors may occur.

In order to protect the first body against voltages above a predetermined maximum the second body 28 is formed of a metal oxide varistor body. As shown the varistor body also acts as a substrate to support the electrical conductors. It is to be noted that the full thickness of the substrate is not shown, as this has no bearing upon the current conducting characteristic of the substrate, unlike the situation in the conventional thyristor 1. Rather, for the metal oxide varistor body 28 the voltage that will be sustained across the electrodes for a given current density is determined by the lateral conduction gap width Y—i.e., not the thickness of the substrate, but the lateral surface separation of the electrical conductors. This means that the thickness of the substrate may be selected so that its mechanical properties are optimized rather than being subordinated to electrical requirements.

The current that is shunted between the first and second electrical conductors through the second body is confined primarily to a small area at or just below the surface of the metal oxide varistor body at the conduction gap. Hence in my arrangement current a localized, is alocalized, primarily surface phenomenon, rather than a uniformly distributed, primarily bulk phenomenon, as is present in the conventional metal oxide varistor.

To protect the surface of the metal oxide varistor body 28 within the conduction gap dielectric body 29 is provided. The dielectric body is not essential where the circuit arrangement is to be utilized in a protected environment. For example, the arrangement 20 could be incorporated in a hermetically sealed housing alone or in combination with other electrical components. Since the conduction gap surface is most critical to the conduction properties of the metal oxide varistor body in my inventive arrangement, I prefer to utilize a dielectric at this location to assure protection from environmentally encountered substances which might alter the electrical characteristics of the varistor body. Preferred dielectrics include conventional semiconductor passivants and packaging dielectrics. I particularly prefer to utilize glass as a dielectric body, since it is highly impervious and stable. The dielectric body 29 may, if desired, be bonded to both the bodies 27 and 28 simultaneously to protect both. The arrangement shown may be entirely encapsulated within a dielectric, if desired, or otherwise packaged by conventional techniques.

In the form of my invention generally described above it is apparent that the metal oxide varistor body may be used generally as a substrate in place of alumina or beryllia in the fabrication of conventional hybrid circuits. Metal oxide varistor bodies are suited to this purpose, since they are relatively good thermal conductors, normally exhibiting thermal conductivities in excess of 0.01 calorie-cm per sec-cm$^2$-°C. In the arrangement 20 it can be seen that a large area of the first body 27 lies in low impedance thermally conductive relation with the second body 28 through the electrical conductors. It is appreciated that a conventional heat sink may be attached to a lower surface (not shown) of the second body 28 to receive heat generated both by the first body and the second body during circuit operation. While for simplicity the shunt arrangement 20 is shown provided with only the electrical conductors lying between the bodies, it is appreciated that one or both of the bodies may be provided with separate electrodes bonded to a surface thereof for the purpose of facilitating attachment of the bodies to the electrical conductors. In most instances the body which serves as a substrate is directly bonded to the electrical conductors with the remaining, supported body being bonded through intermediate electrodes associated therewith. It is further recognized that the electrical conductors may be made up of plural layers of dissimilar conductors. The interposition of multiple conductive layers between the bodies does not significantly affect heat transfer therebetween, however, since the thermal resistance of metallic conductors between the bodies is so low by comparison as to be negligible. This relationship is particularly true in view of the fact that the bodies are associated with major surfaces of the electrical conductors rather than related by restricted thermal conduction paths — i.e., electrical leads.

To more specifically illustrate my concept of utilizing a metal oxide varistor body as a substrate for a hybrid circuit arrangement, attention is directed to FIGS. 3 through 6 inclusive. Synce hybrid circuit arrangements may take various forms and include large numbers of functional components, it is apparent that it would be unduly burdensome to attempt to illustrate all possible hybrid circuit applications. Accordingly, these exemplary embodiments are set forth to illustrate several contemplated varistor structural and functional relationships one, some, or all of which may be incorporated into a specific hybrid circuit as the need occurs.

Figure 3:
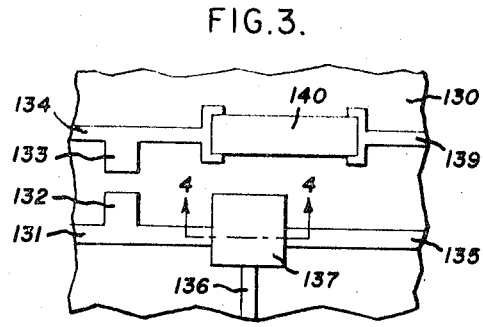
FIG. 3 is a schematic plan detail of a hybrid circuit; a rugged for even voltage applications.
Figure 4:
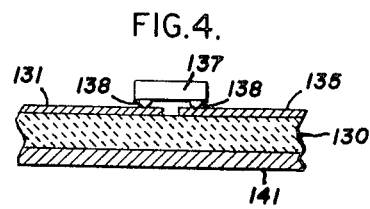
FIG. 4 is a sectional view taken along section line 4—4 in FIG. 3.

In FIGS. 3 and 4 the portion of the hybrid circuit shown incorporates a metal oxide varistor body 130, which serves as a substrate. Associated with the upper major surface of the substrate are a plurality of laterally spaced metal runs (—i.e., electrical conductors for interconnecting the functional portions of the circuit). A first metal run or conductor 131 is provided with a first lateral protrusion 132 whichis located in predetermined lateral spacing with a second lateral protrusion 133 of a second, laterally spaced run 13. The closest approach of the first and second runs is adjacent which is lateral protrusions. Third and fourth metal runs 135 and 136 approach one extremity of the first metal run, but are laterally spaced therefrom by a predetermined interval. A semicondcutor flip-chip is provided with raised dot connectors 138 each contacting one of the first, third, and fourth metal runs. The flip-chip may be a transistor, thyristor, integrated circuit, or other three terminal semiconductor element. It is also appreciated that three terminals are shown merely for purposes of illustration and that the flip-chip could have as few as two terminals or a very large number of terminals, as is typical of integrated circuits. A fifth metal run 139 is laterally spaced from the second metal run and a discrete functional element 140, such as a resistor, capacitor, or circuit inductance element is shown having its opposite ends in ohmic contact with the second and fifth run terminations. A metal electrode 141, which may also serve as a heat sink, is shown covering the lower major surface of the varistor body.

For the purposes of describing the operation of the hybrid circuit portion shown it may be assumed that the separation of the first and third runs at their nearest approach is greater than the nearest approach of the first and second lateral projections and that the thickness of the metal oxide varistor body exceeds both of these lateral spacings. In this instance it can be seen that the flip-chip 137 is protected against excessive voltage levels across its terminals by the spacing between the first and third runs. Should, however, the current carrying capacity of the spacing between the first and third runs through the conduction gap therebeteween at or immediately beneath the surface of the varistor body be approached so that the voltage of the first run begins to rise with respect to that of the third run notwithstanding the shunting action, a voltage level can be reached, still below the level at which the flip-chip would be damaged, at which a significant current shunt between the first and second lateral projections occurs. This adds back-up shunt protection to that afforded by the gap between the first and third runs. If, notwithstanding the shunting action between the first and third runs and between the first and second lateral projections, the voltage level of the first run should continue to rise, as might occur if a large power surge were received by the circuit, the circuit could still be protected by a significant fraction of the current being shunted from the first run to the electrode 141. In this way the flip-chip 137 is protected by three separate current paths each successively becoming active to protect the flip-chip from damage due to voltage transients. In a similar manner, it can be seen that where electrical power is supplied through the second run the first and second lateral projections serve as a first shunt path protecting the discrete functional element 140 and that conduction between the second run and the electrode 141 serves as a back-up protection.

Figure 5:
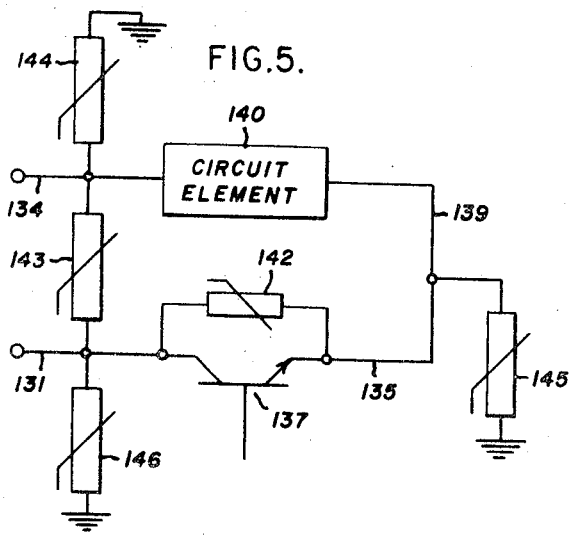
FIG. 5 is a schematic circuit diagram illustrating the functional elements of the hybrid circuit of FIGS. 3 and 4.

If it is assumed that the third and fifth metal runs 135 and 139, respectively, are electrically interconnected, the flip chip 137 is an NPN transistor, and the metal electrode 141 lies at ground potential, it can be seen that the hybrid circuit detail shows in FIGS. 3 and 4 may be diagrammed as shown in FIG. 5. The use of a single metal oxide varistor body as a substrate 130 performs the same function as at least five discrete varistors as well as performing the physical mounting and thermal dissipation functions of the substrate. More specifically, the function of the discrete varistor 142 shown connected across the emitter and collector of the flip chip is performed at the conduction gap surface separating the first and third metal runs under the flip chip. This varistor will conduct higher currents at lower voltages than any of the remaining varistors. The function of the discrete varistor 143 between the first and second metal runs is performed at the conduction gap between the protrusions 132 and 133 on these runs. The varistor 143 does not conduct appreciable currents until a voltage level is reached above the value at which the varistor 142 begins to conduct appreciable currents. The varistors 144, 145, and 146, all of which begin to conduct appreciable currents at equal voltage values, represent the current paths through the metal oxide varistor substrate to the metal electrode 141. These varistors conduct appreciable currents only after a voltage level is reached at which the varistors 142 and 145 have already begun to conduct appreciable currents. It is recognized that two additional varistors could be added to the diagram shunting the base lead to the emitter and collector of the transistor. Whether or not these additional varistor functions are present depends, of course, upon the spacing chosen for the fourth metal run 136 with respect to the first and third metal runs 131 and 135.

Figure 6:
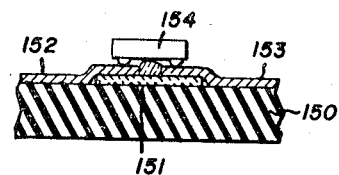
FIG. 6 is similar to FIG. 4, but is directed to an alternative construction.

In FIG. 6 a somewhat modified form of the hybrid circuit as shown in FIG. 4 is illustrated. A dielectric support 150 of any conventional type is shown provided with a varistor body 151 located adjacent its upper surface. First and second runs 152 and 153 are laterally separated forming a conduction gap adjacent the upper surface of the varistor body. A flip-chip 154, which may be identical to flip-chip 137, is shown connected to the first and second runs across the conduction gap. The operation of the hybrid circuit shown in FIG. 6 is similar to that of FIG. 4, except there is no element corresponding to electrode 141 shown to provide back-up voltage surge protection. It is anticipated that the bottom surface of the metal oxide varistor body could be provided with an electrode in the FIG. 6 embodiment to perform this function. In this instance it would, of course, be preferred that the thickness of the metal oxide varistor body exceed the conduction gap width between the metal runs.

Figure 8:
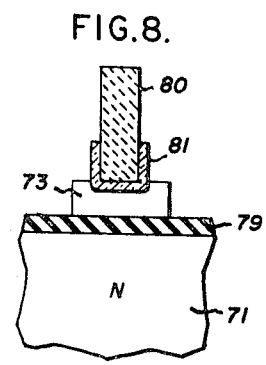
FIG. 8 is a sectional view taken along section line 8—8 in FIG. 7.
Figure 7:
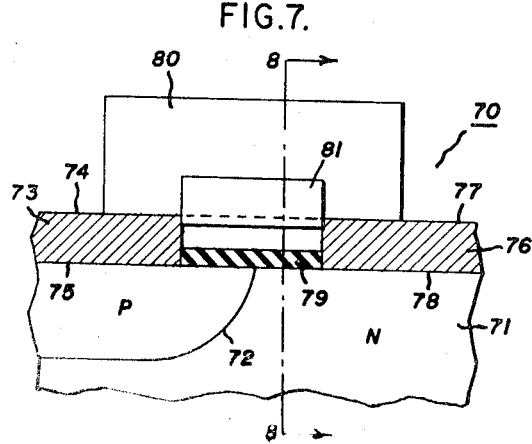
FIG. 7 is a sectional detail of a modified form of my invention.

In an additional form of my invention it is contemplated that the hybrid circuit shunt arrangement 20 shown in FIG. 2 may take a form in which the first body 27 is a metal oxide varistor body and the second body 28, which forms the substrate, may be a discrete circuit functional element, such as a resistor, capacitor, inductance element, semiconductor element, or monolithic or hybrid integrated circuit module. A specific illustration of such an arrangement in which a semiconductor element, which may be a portion of a monolithic integrated circuit, forms the substrate is shown in FIGS. 7 and 8.

The hybrid circuit shunt arrangement 70 is made up of a semiconductor element 71 having a P-N junction 72 formed therein. A first electrode 73 having a first major surface 74 and a second major surface 75 is located in ohmic conductive relation with the P conductivity type portion of the semiconductive element along its second major surface. In like manner, a second electrical conductor having a first major surface 77 and a second major surface 78 is located in ohmic conductive relation with the N conductivity type portion of the semiconductive element along its second major surface. The conductors are laterally spaced, and a dielectric junction passivant 79 is located within the conduction gap between the conductors. The remaining structure of the semiconductive element is not shown as it is immaterial to my inventive arrangement and may take any convenient conventional form.

A metal oxide varistor body 80 is positioned on edge so that it overlies the portion of the first and second electrical conductors immediately adjacent the conduction gap. A low impedance electrical interconnection is formed between the varistor body and each of the electrical conductors. To protect the active edge portion of the varistor body overlying the conduction gap between the electrical conductors a dielectric passivant coating 81 (shown as a glass coating) is bonded thereto. It is to be noted that placing the varistor body on edge is not necessary but is convenient in that it can allow attachment of the varistor body to the electrical conductors while pre-empting a minimum amount of semiconductor surface area. Further, by mounting the varistor body on edge so that it is transversely oriented with respect to the semiconductive element, heat dissipation from the varistor body can be improved, since a larger proportion of the varistor body is exposed to the ambient atmosphere. It is anticipated that a portion of the varistor body could extend outwardly through any package employed to protect the semiconductive element.

While I have disclosed my invention with reference to certain preferred embodiments, it is appreciated that numerous variations will readily occur to those skilled in the art. It is accordingly intended that the scope of my invention be determined by reference to the following claims.

What I claim and desire to secure by Letters Patent of the United States is:

1. The combination comprising
   first and second laterally spaced electrical conductors each having first and second major surfaces,
   first electronic circuit means lying in conductive contact with said first major surfaces of said first and second spaced electrical conductors for controlling current therebetween when an electrical potential less than a predetermined maximum value is impressed across said electrical conductors, and
   metal oxide varistor body means having an alpha in excess of 10 in the current density range of from $10^{-3}$ to $10^2$ amperes per square centimeter lying in conductive contact with said second major surfaces of said first and second electrical conductors for voltage-responsively variably conducting current therebetween in shunt with said first electronic circuit means to maintain the electrical potential impressed across said electrical conductors less than the predetermined maximum value.

2. The combination according to claim 1 in which said first electronic circuit means is a semiconductor elements.

3. The combination according to claim 1 in which said first electronic circuit means is a resistor.

4. The combination according to claim 1 in which said first electronic circuit means is a capacitor.

5. The combination according to claim 1 in which said first electronic circuit means is an inductance means.

6. The combination according to claim 1 in which the spacing between said electrical conductors at their interconnection with said metal oxide varistor body means is less than the thickness of said varistor body means normal to said spacing.

7. The combination according to claim 1 in which dielectric means is attached to said metal oxide varistor body means between its interconnections with said electrical conductors.

8. The combination comprising
   a substrate having first and second opposed major surfaces comprised of a metal oxide varistor body lying along at least said first major surface and having an alpha in excess of 10 in the current density range of from $10^{-3}$ to $10^2$ amperes per square centimeter,
   first and second electrical conductors each having first and second major surfaces, said first major surfaces of said conductors lying in ohmic contact with said first major surface of said substrate, and said electrical conductors being laterally spaced to form a conduction gap therebetween along said first major surface, and
   discrete electronic circuit means lying in conductive contact with each of said first and second electrical conductors along said second major surfaces thereof.

9. The combination according to claim 8 in which said discrete electronic circuit means is a semiconductive element.

10. The combination according to claim 8 in which said discrete electronic circuit means is a capacitor.

11. The combination according to claim 8 in which said discrete electronic circuit means is a resistor.

12. The combination according to claim 8 in which said discrete electronic circuit means is an inductance means.

13. The combination according to claim 8 in which said varistor body lies along both said first and second opposed major surfaces of said substrate and additionally including a third electrical conductor lying in ohmic contact with said second major substrate surface, the thickness of said varistor body being greater than the width of the conduction gap.

14. The combination according to claim 8 in which said varistor body extends between said first and second opposed major surface of said substrate and exhibits a thermal conductivity of at least 0.01 calorie-cm/sec-cm²-°C and additionally including heat sink means lying in thermally conductive relation with said second major surface.

15. The combination according to claim 8 additionally including a third electrode associated with said first major substrate separated from said first electrical conductor by said second electrical conductor, said third electrical conductor being laterally spaced from said second electrical conductor by a second conduction gap width which exceeds the width of the conduction gap width between said first and second electrical conductors.

16. The combination according to claim 8 in which said substrate is additionally comprised of a dielectric support associated with said varistor body.

17. The combination according to claim 16 in which a portion of said dielectric support lies along said first major surface.

18. The combination according to claim 16 in which a portion of said dielectric support lies along said first major substrate surface and in contact with said first and second electrical conductors.

19. The combination comprising
first and second laterally spaced electrical conductors,
a semiconductive substrate lying in conductive contact with said first and second spaced electrical conductors for conducting current therebetween when an electrical potential less than a predetermined maximum value is impressed across said electrical conductors, and
metal oxide varistor body means having an alpha in excess of 10 in the current density range of from $10^{-3}$ to $10^2$ amperes per square centimeter lying in conductive contact with and being supported by said first and second electrical conductors for variably conducting current therebetween in shunt with said semiconductive substrate to maintain the electrical potential impressed across said electrical conductors less than the predetermined maximum value.

20. The combination according to claim 19 in which said varistor body means is provided with a dielectric coating between its interconnections with said electrical conductors.

21. The combination according to claim 19 in which said varistor body means is provided with a glass coating between its interconnections with said electrical conductors.

22. The combination according to claim 19 in which said varistor body means is interconnected with said first and second electrical conductors along an edge surface.

23. The combination according to claim 19 in which said varistor body means is interconnected with said first and second electrical conductors along an edge surface and is tranversely oriented with respect to said semiconductive substrate.

24. The combination according to claim 19 in which said semiconductive substrate is provided with a junction interposed between its interconnections with said first and second electrical conductors, said junction having a maximum reverse voltage blocking capability dictating the predetermined maximum potential.

25. The combination according to claim 19 in which said semiconductive element is a monolithic integrated circuit.

* * * * *